US009033310B2

(12) United States Patent
Zurke et al.

(10) Patent No.: US 9,033,310 B2
(45) Date of Patent: May 19, 2015

(54) ELECTROMAGNET VALVE

(75) Inventors: Janusz Zurke, Straelen (DE); Alvito Fernandes, Leverkusen (DE)

(73) Assignee: PIERBURG GMBH, Neuss (DE)

( * ) Notice: Subject to any disclaimer, the term of this patent is extended or adjusted under 35 U.S.C. 154(b) by 122 days.

(21) Appl. No.: 13/582,054

(22) PCT Filed: Jan. 28, 2011

(86) PCT No.: PCT/EP2011/051212
§ 371 (c)(1), (2), (4) Date: Aug. 31, 2012

(87) PCT Pub. No.: WO2011/107310
PCT Pub. Date: Sep. 9, 2011

(65) Prior Publication Data

US 2012/0326067 A1 Dec. 27, 2012

(30) Foreign Application Priority Data

Mar. 3, 2010 (DE) ......................... 10 2010 010 187

(51) Int. Cl.
*F16K 31/02* (2006.01)
*H01F 7/08* (2006.01)
(Continued)

(52) U.S. Cl.
CPC .................. *H01F 7/081* (2013.01); *H01F 7/13* (2013.01); *H01F 7/1607* (2013.01); *H01F 2007/163* (2013.01)

(58) Field of Classification Search
CPC .......... F16K 31/0655; H01F 2007/085; H01F 7/1623
USPC ................ 251/129.15, 129.18; 335/262, 259, 335/262.264, 265, 270, 273
See application file for complete search history.

(56) References Cited

U.S. PATENT DOCUMENTS 3,883,839 A 5/1975 Barrett et al.
4,218,021 A * 8/1980 Palma ........................ 239/585.2
(Continued)

FOREIGN PATENT DOCUMENTS

CN 101375354 A 2/2009
CN 101641540 A 2/2010
(Continued)

OTHER PUBLICATIONS

PCT International Preliminary Report on Patentability (IPER) of PCT/EP2011/051212 (Sep. 25, 2012).
(Continued)

*Primary Examiner* — John K Fristoe, Jr.
*Assistant Examiner* — Kevin Barss
(74) *Attorney, Agent, or Firm* — Norman B. Thot

(57) ABSTRACT

An electromagnetic valve with an electromagnetic circuit includes a coil wound onto a coil former, a core, a magnetic return device, a valve closure element, a guide pin, and an armature which is substantially hollow. The armature is mounted so as to be movable with an inwardly directed face on the guide pin. The armature acts at least indirectly on the valve closure element. The guide pin comprises a surface. The surface is arranged to point radially outwards so as to form a first part directed towards the core and a second part directed towards the armature. The first part is configured to be magnetized. The second part is configured not to be magnetized. A control edge is formed between the first part and the second part.

14 Claims, 3 Drawing Sheets

(51) Int. Cl.
*H01F 7/13* (2006.01)
*H01F 7/16* (2006.01)

(56) References Cited

U.S. PATENT DOCUMENTS

| | | | | |
|---|---|---|---|---|
| 7,093,613 | B2 * | 8/2006 | Hofling et al. | 137/554 |
| 7,464,959 | B2 * | 12/2008 | Pillsbury et al. | 280/731 |
| 2003/0213928 | A1 | 11/2003 | Masuda et al. | |
| 2006/0028311 | A1 * | 2/2006 | Burger et al. | 335/229 |
| 2010/0044608 | A1 | 2/2010 | Ogawa | |

FOREIGN PATENT DOCUMENTS

| | | | |
|---|---|---|---|
| DE | 42 21 112 | A1 | 1/1994 |
| DE | 102 48 125 | A1 | 5/2004 |
| EP | 1 363 057 | B1 | 12/2007 |
| JP | 63-133675 | U | 9/1988 |

OTHER PUBLICATIONS

PCT Written Opinion of the international Searching Authority of PCT/EP2011/051212.

* cited by examiner

ELECTROMAGNET VALVE

CROSS REFERENCE TO PRIOR APPLICATIONS

This application is a U.S. National Phase application under 35 U.S.C. §371 of International Application No. PCT/EP2011/051212, filed on Jan. 28, 2011 and which claims benefit to German Patent Application No. 10 2010 010 187.7, filed on Mar. 3, 2010. The International Application was published in German on Sep. 9, 2011 as WO 2011/107310 A1 under PCT Article 21(2).

FIELD

The present invention relates to an electromagnetic valve with an electromagnetic circuit which comprises a coil wound onto a coil former, an armature, a core and a magnetic return device, wherein the armature is substantially hollow and is mounted movably with an inwardly directed face thereof on a guide pin and acts at least indirectly on a valve closure element.

BACKGROUND

Such an electromagnetic valve is described in DE 102 48 125 where the electromagnetic valve serves as a drive for an overrun air recirculation valve. In particular in the field of combustion engines, there is a constant demand to provide electromagnetic valves with maximum magnetic force, while providing minimum structural size, wherein the magnetic force is as linear as possible even over a large adjustment range in order to provide a precise control of the different valve types. The known electromagnetic valve has drawbacks, in particular with respect to the magnitude of the magnetic force and the linearity of the course of the magnetic force.

SUMMARY

An aspect of the present invention is to provide an electromagnetic valve that avoids the above-mentioned drawbacks.

In an embodiment, the present invention provides an electromagnetic valve with an electromagnetic circuit which includes a coil wound onto a coil former, a core, a magnetic return device, a valve closure element, a guide pin, and an armature which is substantially hollow. The armature is mounted so as to be movable with an inwardly directed face on the guide pin. The armature acts at least indirectly on the valve closure element. The guide pin comprises a surface. The surface is arranged to point radially outwards so as to form a first part directed towards the core and a second part directed towards the armature. The first part is configured to be magnetized. The second part is configured not to be magnetized. A control edge is formed between the first part and the second part.

BRIEF DESCRIPTION OF THE DRAWINGS

The present invention is described in greater detail below on the basis of embodiments and of the drawings in which.

DETAILED DESCRIPTION

Figure 1:
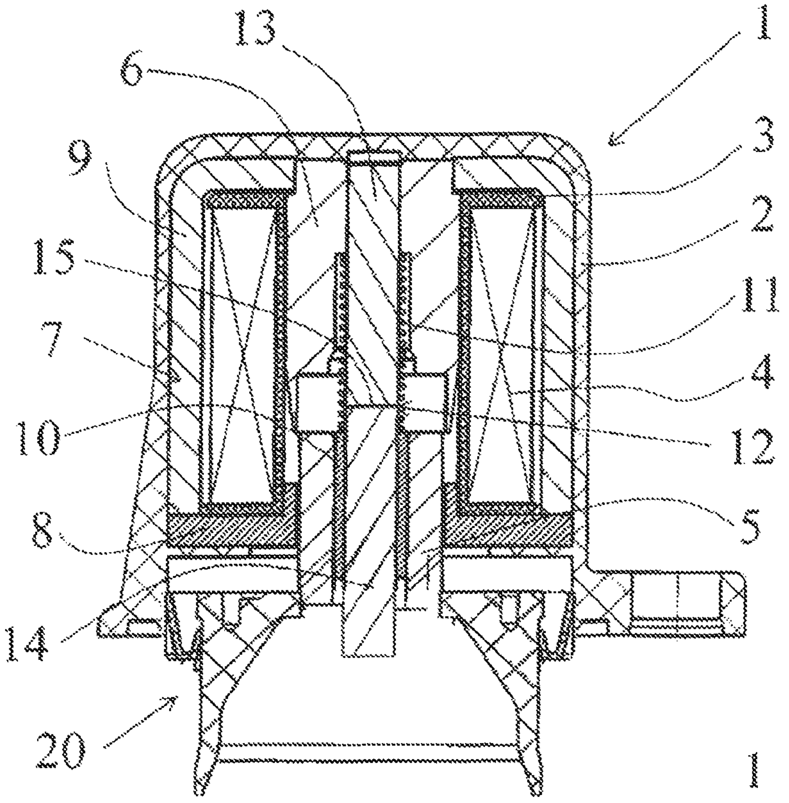
FIG. 1 shows a sectional view of the electromagnetic valve of the present invention in a position 1.

A substantial increase in magnetic force is provided in a simple manner with such a design. A more uniform course of the magnetic force is further obtained over the valve stroke. Such an electromagnetic valve can be manufactured in an economic manner if the guide pin is formed by a first magnetizable part and a second non-magnetizable part, which may, for example, be welded or pressed together. Due to the fact that the control edge between the first and the second part has a defined contour directed towards the armature, e.g. a dome-shaped or pointed surface, an additional adjustment of the magnetic force is possible.

If the guide pin is entirely made from magnetizable material, with the second part comprising a non-magnetizable bushing, such as a plastic material slide bushing, the electromagnetic valve is particularly simple to manufacture.

In an embodiment of the present invention the second non-magnetizable part can, for example, serve as a bearing for the armature, with the second part of the guide pin having a larger diameter than the first part.

In an embodiment of the present invention, the guide pin can, for example, be arranged so as to be adjustable through a thread in the core. This offers the additional possibility of a fine adjustment of the magnetic force within a certain range.

Embodiments are illustrated in the drawings and will be described hereunder.

FIG. 1 illustrates an embodiment of the present electromagnetic valve 1. Such electromagnetic valves are in particular used in the field of combustion engines where they are used, for example, to drive overrun air recirculation valves, electro-pneumatic pressure converters, etc. The electromagnetic valve is formed substantially by a housing 2 in which are arranged a coil 4 wound on a coil former 3, a movable armature 5, a core 6 and a magnetic return device 7. In the embodiment, the magnetic return device 7 is formed by a backiron 8 and a yoke 9. The armature 5 is configured as a valve rod, which is not illustrated in detail, which either directly or indirectly acts on a non-illustrated valve closure element. In the embodiment, the armature 5 comprises a bearing 10 arranged on the inner side thereof, which is configured as a plastic material slide bushing. With this bearing 10, the armature 5 is supported on the core 6 via a compression spring 11. The press-fitted bearing 10, and thus the armature 5, slides in a manner known per se on a guide pin 12 which in the embodiment is fixedly arranged in the core 6 and which also receives the compression spring 11.

In the embodiment, the guide pin 12 is formed by a first magnetizable part 13 and by a second non-magnetizable part 14. Between these two parts 13 and 14, a control edge 15 is formed that provides a better passage of the magnetic field lines into the armature 5 and thereby allows for a greater magnetic force while the dimensions of the structural space remain the same.

Figure 2:
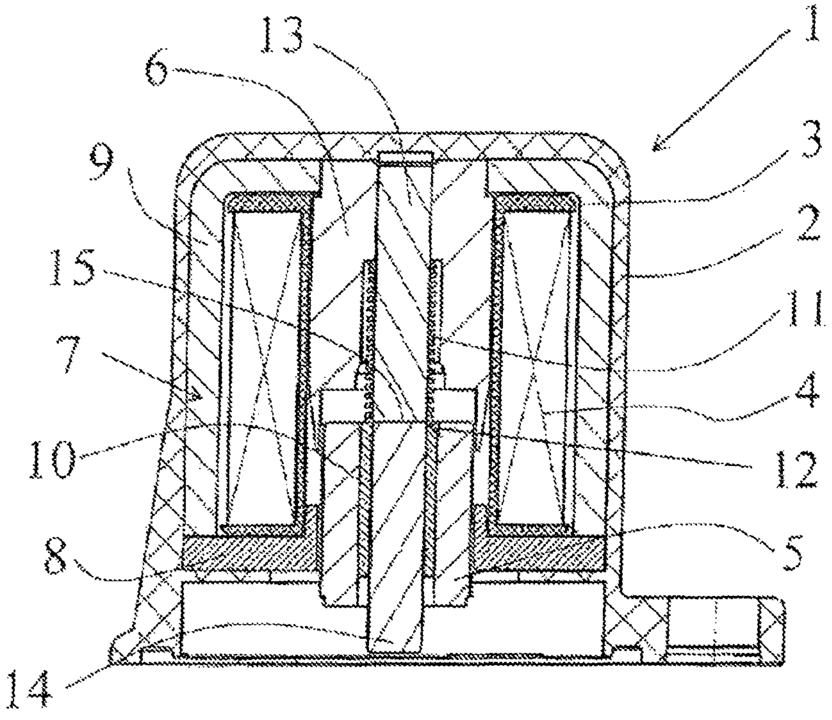
FIG. 2 shows a sectional view of the electromagnetic valve of the present invention in a position 2.

FIG. 2 illustrates the electromagnetic valve 1 of FIG. 1 in an energized state. The armature 5 with the press-fitted bearing 10 has been displaced towards the core 6 against the force of the compression spring 11. It is clearly visible that the armature 5 with the press-fitted bearing 10 substantially slides on the second part 14 that is not magnetic.

Figure 3:
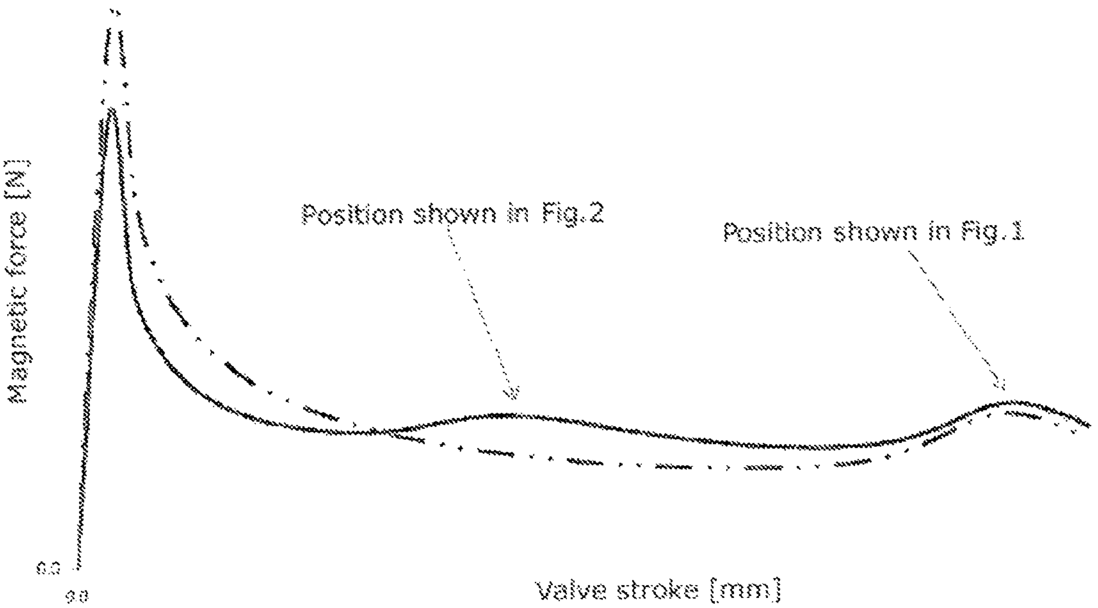
FIG. 3 shows an illustration of the course of the magnetic force over the valve stroke in an electromagnetic valve of conventional structure and according to the present invention, respectively.

FIG. 3 only shows the course of the magnetic force, acting on the armature 5, over the valve stroke. The dotted line indicates the course of the magnetic force of a conventional electromagnetic valve. The solid line illustrates the course of the magnetic force of the present electromagnetic valve 1 of FIGS. 1 and 2. The increase in magnetic force and the flattening of the curve in the region between the positions 1 and 2 illustrated in FIGS. 1 and 2 are clearly visible. A more precise control thereby becomes possible.

Figure 4:
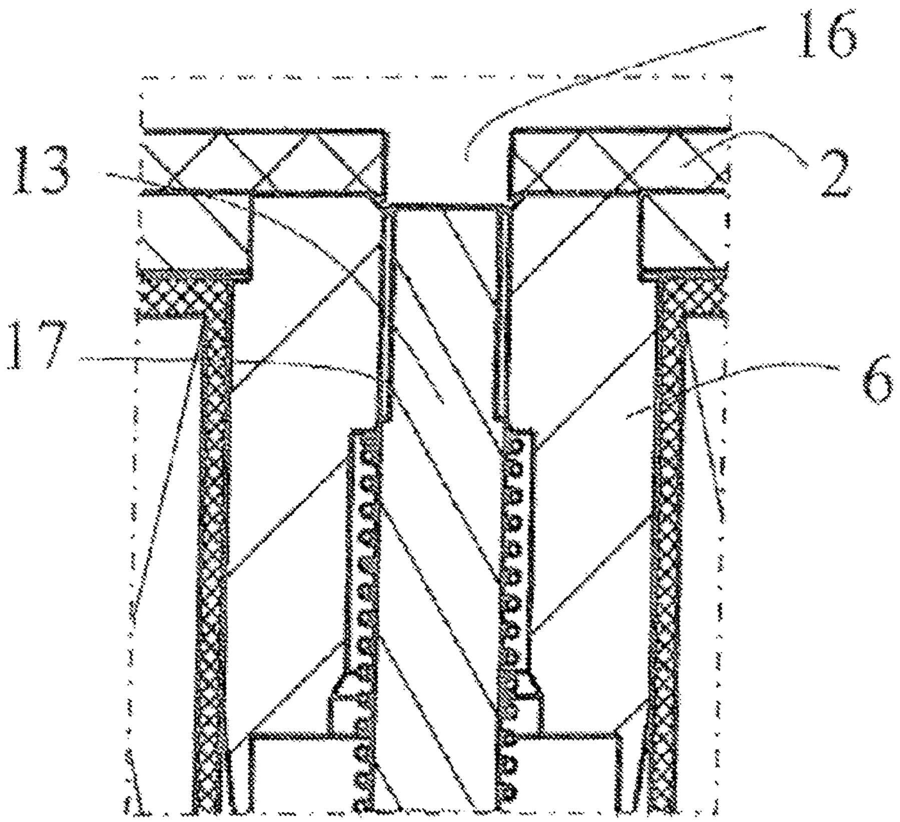
FIG. 4 shows a detail of another embodiment of the electromagnetic valve of the present inventions.

FIG. 4 illustrates another embodiment of the present electromagnetic valve in a detail. The guide pin 12 is here arranged in the core 6 in a manner adjustable by means of a thread 17. In order to be able to make a fine adjustment after assembly, the housing 2 has a cutout 16 through which a fine adjustment of the guide pin 12 can be made. After the fine adjustment, the guide pin can be fixed e.g. by welding spots and the cutout can be closed in a manner known per se.

Other embodiments of the present invention are conceivable that are not illustrated in detail herein. For example, the guide pin can entirely be of a non-magnetizable material, where a first part directed towards the core is made magnetizable by means of a coating or a magnetic material applied thereon. It is also conceivable to make the guide pin entirely from a magnetizable material, where the second part of the guide pin comprises a non-magnetizable bushing on which the armature can then slide. In any case, a control edge is formed between the first part and the second part of the guide pin so as to provide a passage of the magnetic field lines.

Figure 5:
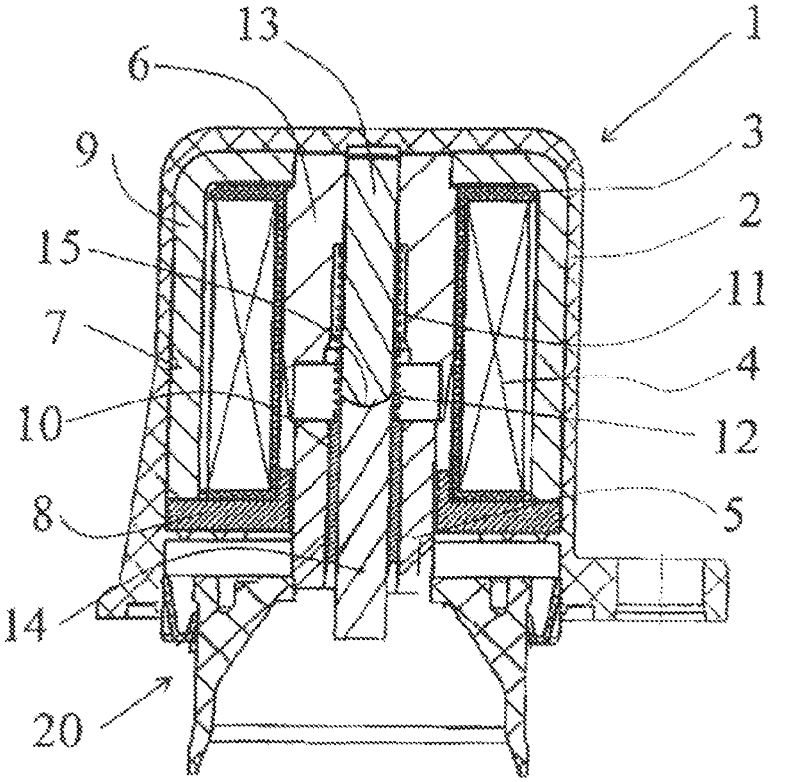
FIG. 5 shows a sectional view of the electromagnetic valve of the present invention where the control edge is dome-shaped.
Figure 6:
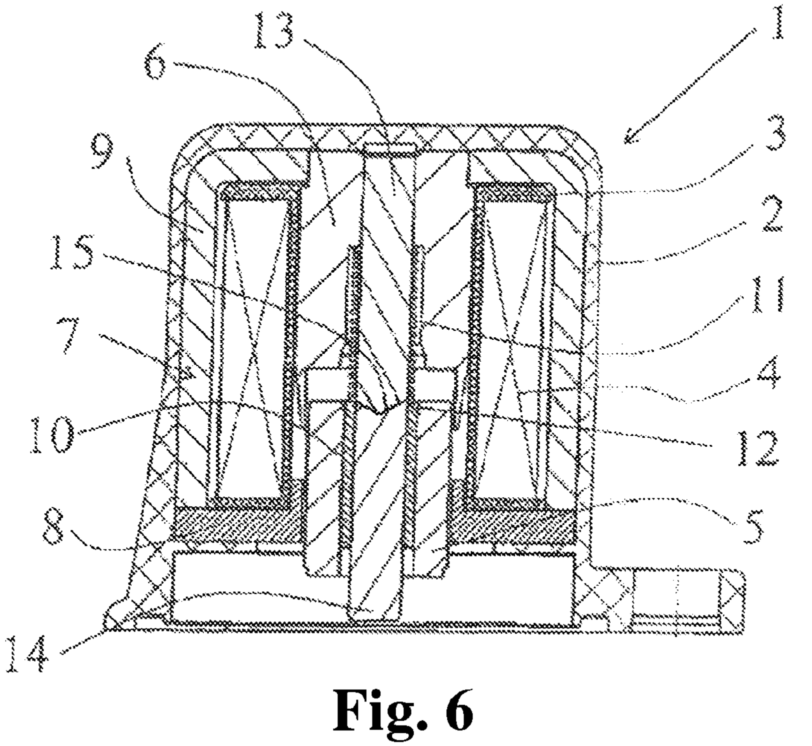
FIG. 6 shows a sectional view of the electromagnetic valve of the present invention where the control edge has a pointed surface.

If, as illustrated in the embodiment, the first part of the guide pin and the second part of the guide pin are made from solid material, the two parts may be connected using known connecting techniques such as soldering, welding, etc. It is also conceivable that the control edge between the two parts is not formed as a plane, but has a contour such as a dome-shaped or pointed surface as is shown in FIGS. 5 and 6, respectively.

The present invention is not limited to embodiments described herein; reference should be had to the appended claims.

What is claimed is:

1. An electromagnetic valve with an electromagnetic circuit, the electromagnetic valve comprising:
- a coil wound onto a coil former;
- a core;
- a magnetic return device;
- a valve closure element;
- a guide pin; and
- an armature which is substantially hollow, the armature being mounted so as to be movable with an inwardly directed face on the guide pin, the armature acting at least indirectly on the valve closure element,
- wherein, the guide pin comprises a surface, the surface being arranged to point radially outwards so as to form
  - a first part comprising a first outer diameter, the first part being disposed in the core, the first part being configured to be magnetized, and
  - a second part comprising a second outer diameter, the second part being directed towards the armature, the second part being configured not to be magnetized,
- wherein, the second outer diameter is larger than or equal to the first outer diameter, and
- wherein, a control edge is formed between the first part and the second part.

2. The electromagnetic valve as recited in claim 1, wherein the control edge formed between the first part and the second part comprises a dome-shape or a pointed surface which is directed towards the armature.

3. The electromagnetic valve as recited in claim 1, wherein the second part is configured to serve as a bearing for the armature.

4. The electromagnetic valve as recited in claim 1, further comprising a thread arranged in the core, wherein the guide pin is arranged so as to allow for a fine adjustment via the thread.

5. An electromagnetic valve with an electromagnetic circuit, the electromagnetic valve comprising:
- a coil wound onto a coil former;
- a core;
- a magnetic return device;
- a valve closure element;
- a guide pin; and
- an armature which is substantially hollow, the armature being mounted so as to be movable with an inwardly directed face on the guide pin, the armature acting at least indirectly on the valve closure element,
- wherein,
- the guide pin comprises a surface, the surface being arranged to point radially outwards so as to form a first part disposed in the core, and a second part directed towards the armature,
- the first part of the guide pin comprises a first outer diameter, the first part comprising a magnetizable material,
- the second part of the guide pin comprises a second outer diameter, the second part comprising a magnetizable material covered by a non-magnetizable bushing, and
- the second outer diameter is larger than or equal to the first outer diameter.

6. The electromagnetic valve as recited in claim 5, wherein the non-magnetizable bushing is a plastic material slide bushing.

7. The electromagnetic valve as recited in claim 5, wherein the second part is configured to serve as a bearing for the armature.

8. The electromagnetic valve as recited in claim 5, further comprising a thread arranged in the core, wherein the guide pin is arranged so as to allow for a fine adjustment via the thread.

9. An electromagnetic valve with an electromagnetic circuit, the electromagnetic valve comprising:
- a coil wound onto a coil former;
- a core;
- a magnetic return device;
- a valve closure element;
- a guide pin; and
- an armature which is substantially hollow, the armature being mounted so as to be movable with an inwardly directed face on the guide pin, the armature acting at least indirectly on the valve closure element,
- wherein, the guide pin comprises a surface, the surface being arranged to point radially outwards so as to form
  - a first part comprising a first outer diameter, the first part being disposed in the core, the first part being configured to be magnetized, and
  - a second part comprising a second outer diameter, the second part being directed towards the armature, the second part being configured not to be magnetized,
- wherein, the second outer diameter is equal to the first outer diameter, and
- wherein, a control edge is formed between the first part and the second part.

10. The electromagnetic valve as recited in claim 9, wherein the control edge formed between the first part and the second part comprises a dome-shape or a pointed surface which is directed towards the armature.

11. The electromagnetic valve as recited in claim 9, wherein the second part is configured to serve as a bearing for the armature.

12. The electromagnetic valve as recited in claim 9, further comprising a thread arranged in the core, wherein the guide pin is arranged so as to allow for a fine adjustment via the thread.

13. The electromagnetic valve as recited in claim 9, wherein the second part of the guide pin further comprises a magnetizable material covered by a non-magnetizable bushing.

14. The electromagnetic valve as recited in claim 13, wherein the non-magnetizable bushing is a plastic material slide bushing.

* * * * *